(12) United States Patent
Kim et al.

(10) Patent No.: US 8,057,720 B2
(45) Date of Patent: Nov. 15, 2011

(54) INJECTION MOLDING MACHINE AND METHOD WITH PRESSING DEVICE

(75) Inventors: Sang Hak Kim, Suwon-si (KR); Han Sub Hwang, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1 day.

(21) Appl. No.: 12/397,563

(22) Filed: Mar. 4, 2009

(65) Prior Publication Data

US 2009/0256281 A1 Oct. 15, 2009

(30) Foreign Application Priority Data

Apr. 10, 2008 (KR) .................. 10-2008-0033080

(51) Int. Cl.
*B29C 45/04* (2006.01)
(52) U.S. Cl. .............. 264/255; 264/297.2; 264/336; 425/129.1; 425/556; 425/444
(58) Field of Classification Search ............ 264/297.2, 264/297.3, 255, 334, 336; 425/127, 128, 425/129.1, 556, 436 RM
See application file for complete search history.

(56) References Cited

U.S. PATENT DOCUMENTS

| 5,018,962 | A  | * | 5/1991  | Kitamura et al. ............ 425/556 |
| 5,413,743 | A  | * | 5/1995  | Prophet ......................... 264/1.7 |
| 6,139,305 | A  | * | 10/2000 | Nesch ........................... 425/130 |
| 6,206,681 | B1 | * | 3/2001  | Kawase et al. ............... 425/517 |
| 7,070,724 | B2 | * | 7/2006  | Nakazawa .................... 264/250 |
| 7,108,496 | B2 | * | 9/2006  | Mueller ........................ 425/112 |

FOREIGN PATENT DOCUMENTS

| DE | 102005017222 | 10/2006 |
| EP | 0884155      | 12/1998 |
| JP | 2005313385   | 11/2005 |
| KR | 20-188896    | 5/2000  |

OTHER PUBLICATIONS

European Search Report issued Aug. 13, 2009 in EP Application No. 09156216.5.

* cited by examiner

*Primary Examiner* — Jill Heitbrink
(74) *Attorney, Agent, or Firm* — Stanzione & Kim, LLP (57) ABSTRACT

An injection molding machine to prevent a molded piece from being separated from a mold after molds are disassembled from each other includes a first mold, a second mold assembled with the first mold to form a cavity, and a binding device or a pressing device to get a molded piece held in the first mold when the first mold and the second mold are disassembled from each other.

14 Claims, 12 Drawing Sheets

INJECTION MOLDING MACHINE AND METHOD WITH PRESSING DEVICE

CROSS-REFERENCE TO RELATED APPLICATIONS

This application claims priority under 35 U.S.C. §119(a) from Korean Patent Application No. 2008-0033080, filed on Apr. 10, 2008 in the Korean Intellectual Property Office, the disclosure of which is incorporated herein in its entirety by reference.

BACKGROUND OF THE INVENTION

1. Field of the Invention

The present general inventive concept relates to an injection molding machine, and more particularly, to an injection molding machine to support a molded piece when molds are disassembled from each other, in order to prevent separation of the molded piece from the mold.

2. Description of the Related Art

An injection molding machine is a machine that produces a molded product by injecting molten resin into a cavity defined by molds and solidifying the resin. There are two types of injection molding machines, one type of which is to produce a molded product through a single molding process using a single material, and the other type of which is to produce a molded product through two or more successive molding processes using two or more materials.

Specifically, a machine to produce a molded product through two successive molding processes is referred to as a double injection molding machine. A double injection molding machine includes a first cavity to form a first molded piece, and a second cavity to receive the first molded piece therein and to secondarily carry out a molding process for the first molded piece. In such a double injection molding machine, the first molded piece formed in the first cavity is moved to the second cavity while being positioned in the molds. Another material is injected into the second cavity containing the first molded piece, to thereby form a double molded piece.

Because the first molded piece formed in the first cavity should be accurately moved to the second cavity, the first molded piece should not be separated from the mold when the molds are disassembled from each other after the first molding process. Also, in a case of a common injection molding machine (not a double injection molding machine), if post processes (e.g., coating, coloring and trimming processes) for the molded piece should be carried out while the molded piece is kept in the molds, preventing separation of the molded piece from the mold is necessary.

An example of a double injection molding machine to prevent separation of a molded piece from a mold when molds are disassembled from each other is disclosed in Korean Utility Model Publication No. 20-188896 (published on Jul. 15, 2000). The disclosed double injection molding machine includes a first cavity formed with recesses, so that protrusions are formed at a first molded piece. Therefore, when molds are disassembled from each other, the protrusions of the first molded piece are kept in a state of being caught by the recesses, and thus the first molded piece is prevented from being separated from the mold. However, because a final molded product produced by the above conventional injection molding machine has unnecessary protrusions, there are problems such that an additional process of eliminating the protrusions from the molded product should be carried out and product quality is deteriorated due to marks of the protrusions.

SUMMARY OF THE INVENTION

The present general inventive concept provides an injection molding machine to prevent separation of a molded piece from a mold when molds are disassembled from each other.

The present general inventive concept also provides an injection molding machine to minimize a generation of scars on a final molded product while having an ability to support a molded piece when molds are disassembled from each other.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an injection molding machine including a first mold, a second mold assembled with the first mold to form a cavity, and at least one binding device to get a molded piece held in the first mold when the first mold and the second mold are disassembled from each other, the binding device including a binding member movably mounted to the first mold to bind or release the molded piece and a driving unit mounted to the first mold to move the binding member back and forth.

The binding member may be moved into or away from the cavity.

The binding member may be moved in a direction toward a periphery of the first mold from a center of the first mold.

The binding member may include a portion defining a portion of the cavity while the first mold and the second mold are in a state of being assembled with each other.

The driving unit may include a hydraulic cylinder.

The foregoing and/or other aspects and utilities of the general inventive concept may also be achieved by providing an injection molding machine including a first mold, a second mold assembled with the first mold to form a cavity, and at least one pressing device to press a molded piece so that the molded piece is held in the first mold when the first mold and the second mold are disassembled from each other, the pressing device including a pressing member movably mounted to the second mold to press or release the molded piece and at least one driving unit mounted to the second mold to move the pressing member back and forth.

The pressing member may be moved back and forth in a direction of assembling or disassembling the first mold and the second mold with/from each other.

The pressing member may keep pressing the molded piece until the first mold and the second mold are disassembled and spaced at a first gap from each other, and may release the molded piece when the first mold and the second mold move away from each other more than the first gap.

The pressing member may include a portion defining a portion of the cavity while the first mold and the second mold are in a state of being assembled with each other.

The pressing member may have a shape extended continuously along a periphery of the molded piece to evenly press the periphery of the molded piece, and the at least one driving unit may include plural driving units arranged apart from each other in the second mold so that the pressing member evenly presses the molded piece.

The foregoing and/or other aspects and utilities of the general inventive concept may also be achieved by providing an injection molding machine including a fixed mold, a movable mold spaced apart from the fixed mold, two rotatable molds movably and rotatably mounted between the fixed mold and the movable mold, the two rotatable molds being selectively assembled with the movable mold to form a first cavity and selectively assembled with the fixed mold to form a second cavity, and at least one binding device to bind a first molded piece formed in the first cavity so that when one of the two rotatable molds is disassembled from the movable mold, the first molded piece is held in one of the two rotatable molds. The binding device includes a binding member movably mounted to the two rotatable molds to bind or release the first molded piece, and a driving unit mounted to the two rotatable molds to move the binding member back and forth.

The foregoing and/or other aspects and utilities of the general inventive concept may also be achieved by providing an injection molding machine including a fixed mold, a movable mold spaced apart from the fixed mold, two rotatable molds movably and rotatably mounted between the fixed mold and the movable mold, the two rotatable molds being selectively assembled with the movable mold to form a first cavity and selectively assembled with the fixed mold to form a second cavity, and a pressing device to press a first molded piece formed in the first cavity so that when one of the two rotatable molds is disassembled from the movable mold, the first molded piece is held in one of the two rotatable molds. The pressing device includes a pressing member movably mounted to the movable mold to press or release the first molded piece, and at least one driving unit mounted to the movable mold to move the pressing member back and forth.

The foregoing and/or other aspects and utilities of the general inventive concept may also be achieved by providing a method of operating an injection molding machine, the method including forming a cavity by assembling a plurality of molds with each other, disassembling the plurality of molds from each other, and holding a molded piece in one of the molds with a pressing device when the molds are being disassembled and a predetermined distance between the molds is not exceeded.

The foregoing and/or other aspects and utilities of the general inventive concept may also be achieved by providing a method of operating an injection molding machine, the method comprising: forming a cavity by assembling a plurality of molds with each other; disassembling the plurality of molds from each other; and binding a molded piece in one of the molds with a binding device while the plurality of molds are in a state of being disassembled from each other.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 6:
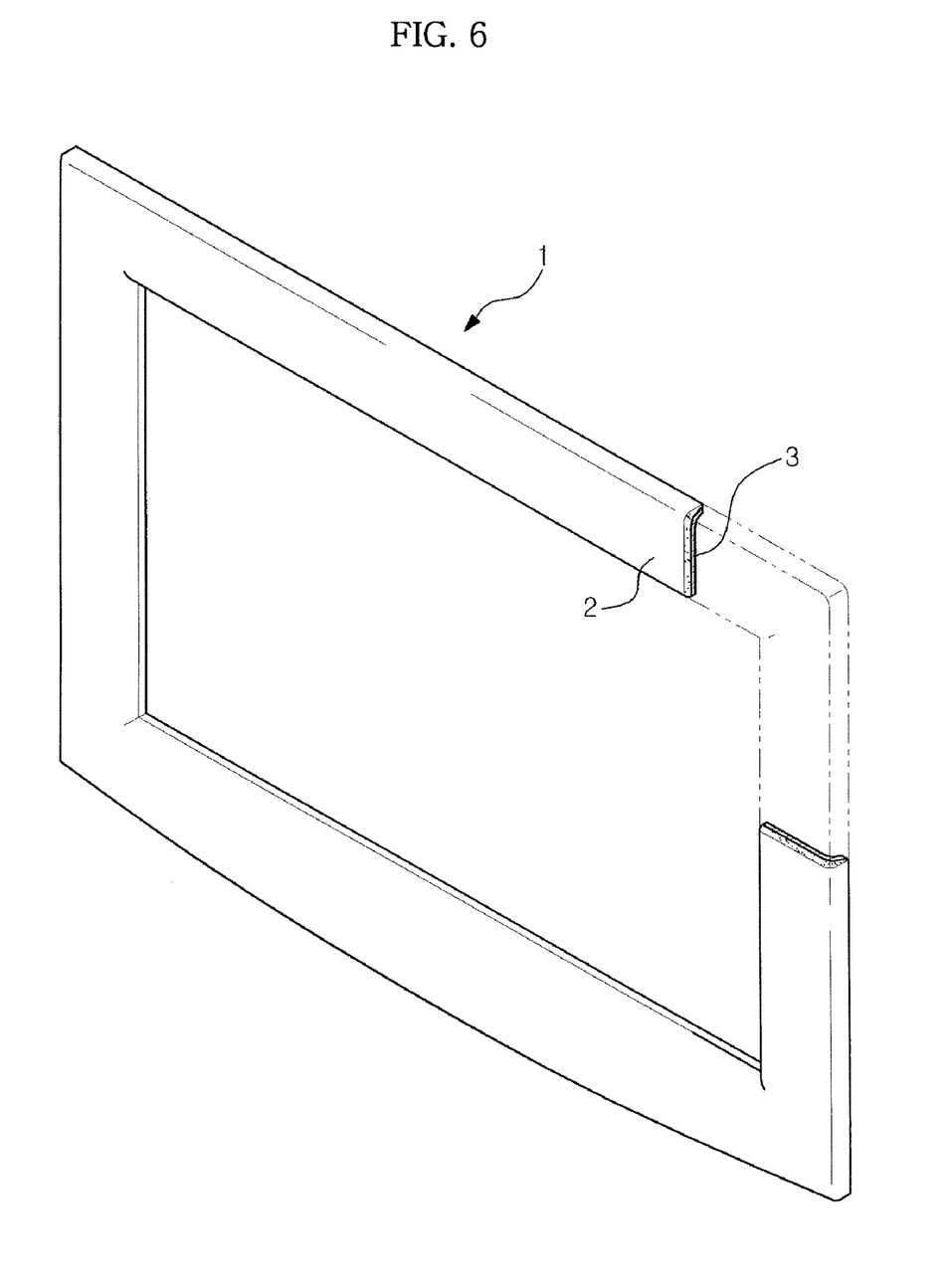
FIG. 6 is a perspective view illustrating a molded product produced by the injection molding machine according to an embodiment of the present general inventive concept.

An injection molding apparatus or machine (machine) according to an embodiment of the present general inventive concept, as illustrated in FIG. 6, can produce a double molded product 1 which includes a transparent layer 2 and a colored layer 3. The double molded product 1 illustrated in FIG. 6 is used for a front case of a display apparatus (e.g., TV, monitor or the like) or a cellular phone, and has an opened center portion so as to expose a screen. However, a molded product produced by the injection molding machine according to an embodiment of the present general inventive concept is not limited to the above-described shape.

Figure 1:
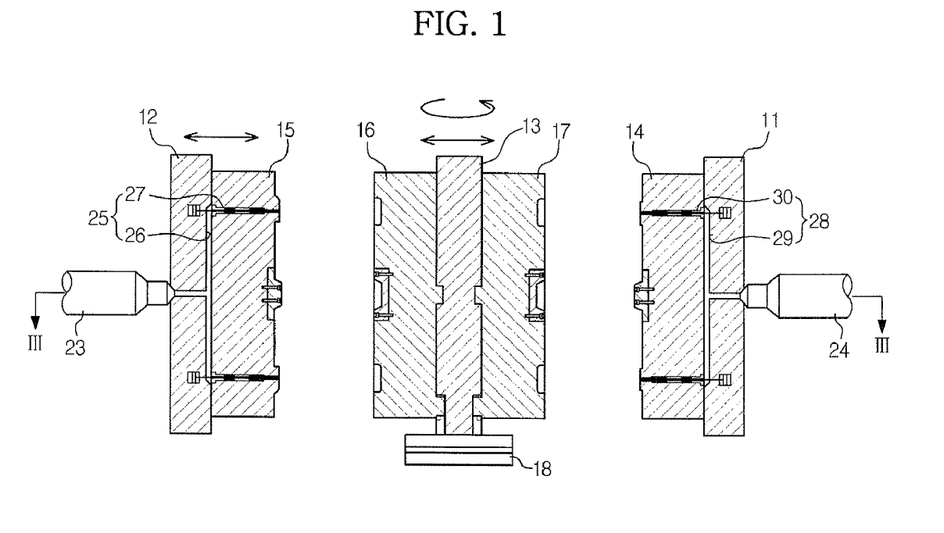
FIG. 1 is a sectional view illustrating a disassembled state of molds of an injection molding machine according to an embodiment of the present general inventive concept.
Figure 2:
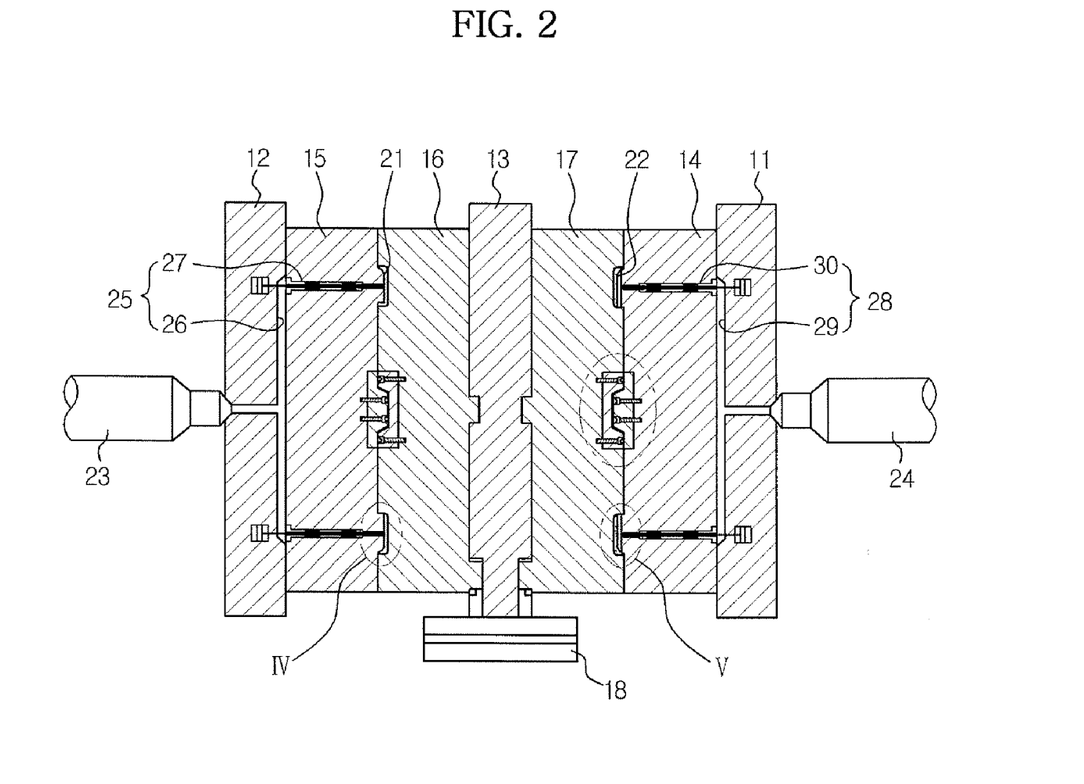
FIG. 2 is a sectional view illustrating an assembled state of the molds of the injection molding machine illustrated in FIG. 1.
Figure 3:
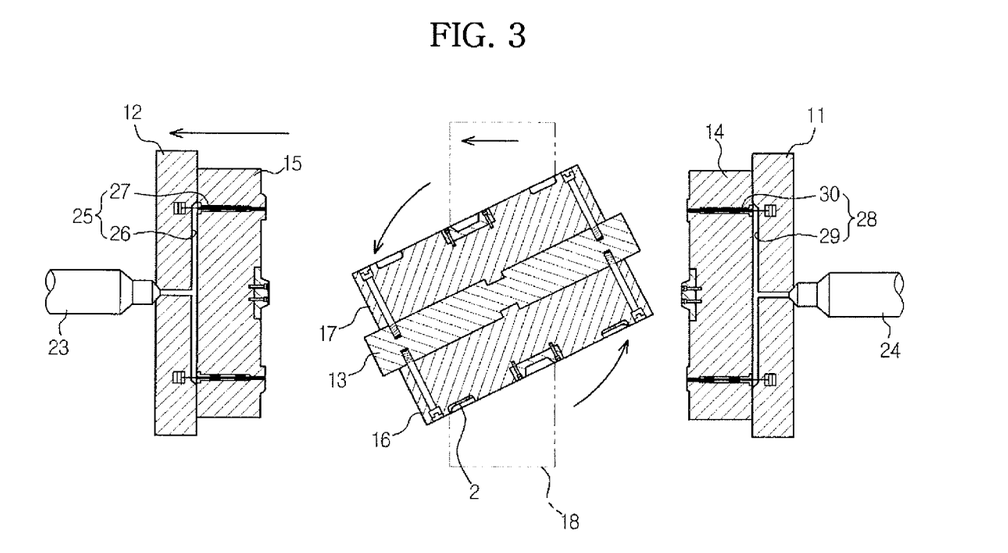
FIG. 3 is a sectional view taken along line III-III' in FIG. 1, which illustrates a rotating state of first and second rotatable molds.

As illustrated in FIGS. 1 to 3, the injection molding machine adapted to produce the double molded product 1 (FIG. 6) includes a fixed supporting plate 11, a movable supporting plate 12 spaced apart from the fixed supporting plate 11, a rotatable supporting plate 13 provided between the fixed supporting plate 11 and the movable supporting plate 12, a fixed mold 14 mounted to the fixed supporting plate 11, a movable mold 15 mounted to the movable supporting plate 12, and a first rotatable mold 16 and a second rotatable mold 17 respectively mounted to both surfaces of the rotatable supporting plate 13.

Although not illustrated in the drawings, the movable supporting plate 12 and the rotatable supporting plate 13 are supported by a movement guide device, such as a rail or a guide bar, so as to be moved toward or away from the fixed supporting plate 11 to assemble or separate the molds 14, 15, 16 and 17. A lower end portion of the rotatable supporting plate 13 is supported by a rotating device 18, and thus the rotatable supporting plate 13 can be rotated so that a position of the first rotatable mold 16 and a position of the second rotatable mold 17 are exchanged.

As illustrated in FIG. 2, the assembling of the movable mold 15 and the first rotatable mold 16 or the assembling of the movable mold 15 and the second rotatable mold 17 forms a first cavity 21 in which the transparent layer 2 of the double molded product 1 illustrated in FIG. 6 is molded. The assembling of the first rotatable mold 16 and the fixed mold 14 or the assembling of the second rotatable mold 17 and the fixed mold 14 forms a second cavity 22 in which the colored layer 3 of the double molded product 1 illustrated in FIG. 6 is molded.

The first rotatable mold 16 and the second rotatable mold 17 substantially have a same shape. Therefore, the positions of the first and second rotatable molds 16 and 17 are exchanged by a rotation of the rotatable supporting plate 13, and the first and second rotatable molds 16 and 17 can be selectively coupled to the fixed mold 14 or the movable mold 15, thereby forming the first cavity 21 or the second cavity 22. This is because the first rotatable mold 16 and the second rotatable mold 17 have the same shape, but the fixed mold 14 and the movable mold 15 have shapes different from each other.

As illustrated in FIG. 2, the movable supporting plate 12 is mounted with a first injection cylinder 23 to supply molten resin (transparent resin) to the first cavity 21, and the movable supporting plate 12 and the movable mold 15 are formed with a first injection passage 25 to guide the molten resin supplied from the first injection cylinder 23 to the first cavity 21. The first injection passage 25 includes first dispersed injection channels 26 formed in the movable supporting plate 12, and a plurality of first runner members 27 mounted in the movable mold 15 so as to be connected with the first dispersed injection channels 26. The first injection cylinder 23 is moved together with the movable supporting plate 12 when the movable supporting plate 12 is moved.

The fixed supporting plate 11 is mounted with a second injection cylinder 24 to supply molten resin (colored resin) to the second cavity 22, and the fixed supporting plate 11 and the fixed mold 14 are formed with a second injection passage 28 to guide the molten resin supplied from the second injection cylinder 24 to the second cavity 22. The second injection passage 28 includes second dispersed injection channels 29 formed in the fixed supporting plate 11, and a plurality of second runner members 30 mounted in the fixed mold 14 so as to be connected with the second dispersed injection channels 29.

In such an injection molding machine, as illustrated in FIG. 1, when the rotatable supporting plate 13 and the movable supporting plate 12 are moved away from the fixed supporting plate 11, the second rotatable mold 17 is separated from the fixed mold 14, and the movable mold 15 is separated from the first rotatable mold 16. Alternatively, as illustrated in FIG. 2, when the rotatable supporting plate 13 and the movable supporting plate 12 are moved toward the fixed supporting plate 11, the molds 14, 15, 16 and 17 can be assembled all together. At this time, the first cavity 21 is formed by the movable mold 15 and the first rotatable mold 16, and the second cavity 22 is formed by the second rotatable mold 17 and the fixed mold 14.

Figure 4:
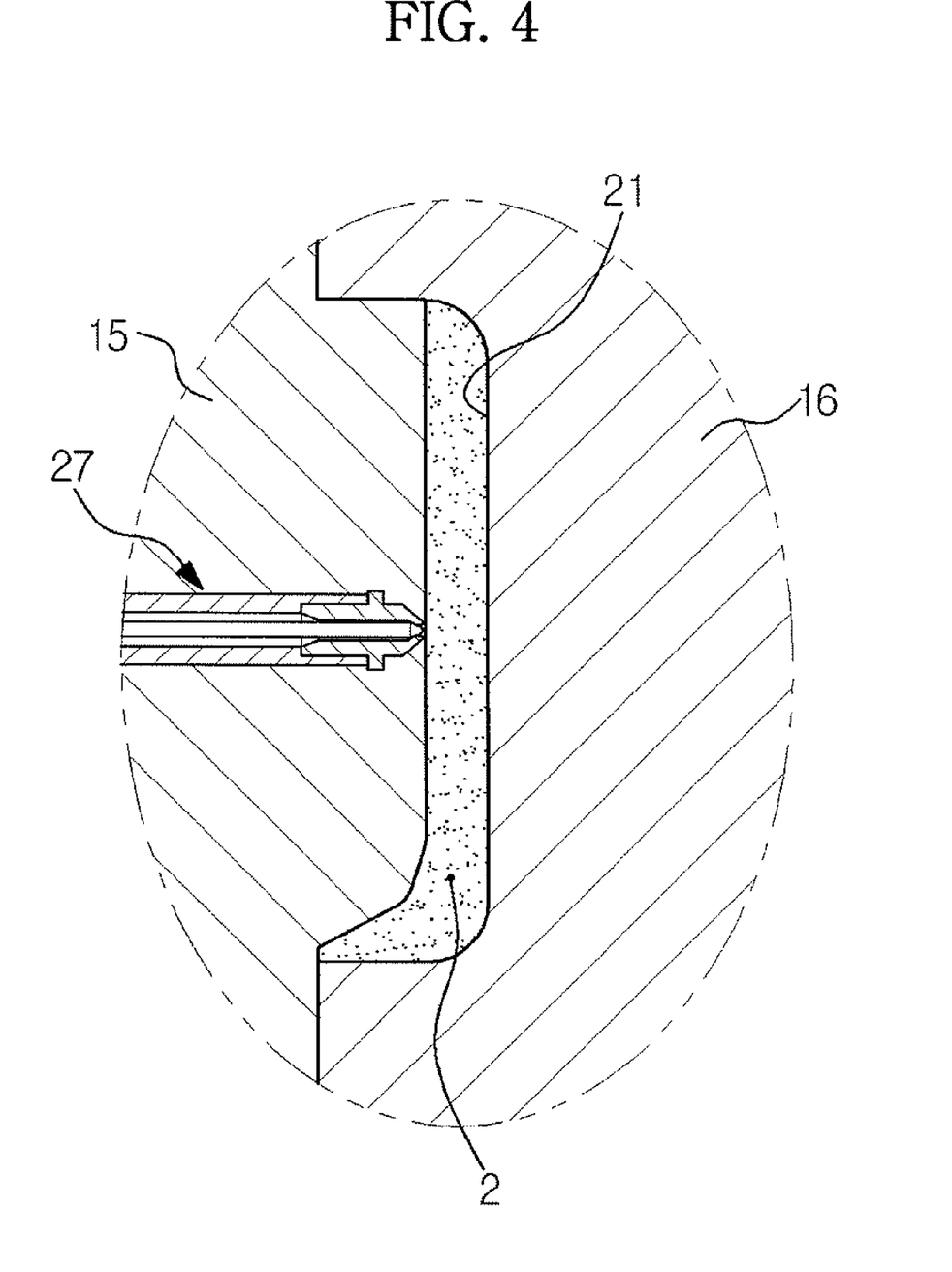
FIG. 4 is a detail view of a IV portion in FIG. 2.
Figure 5:
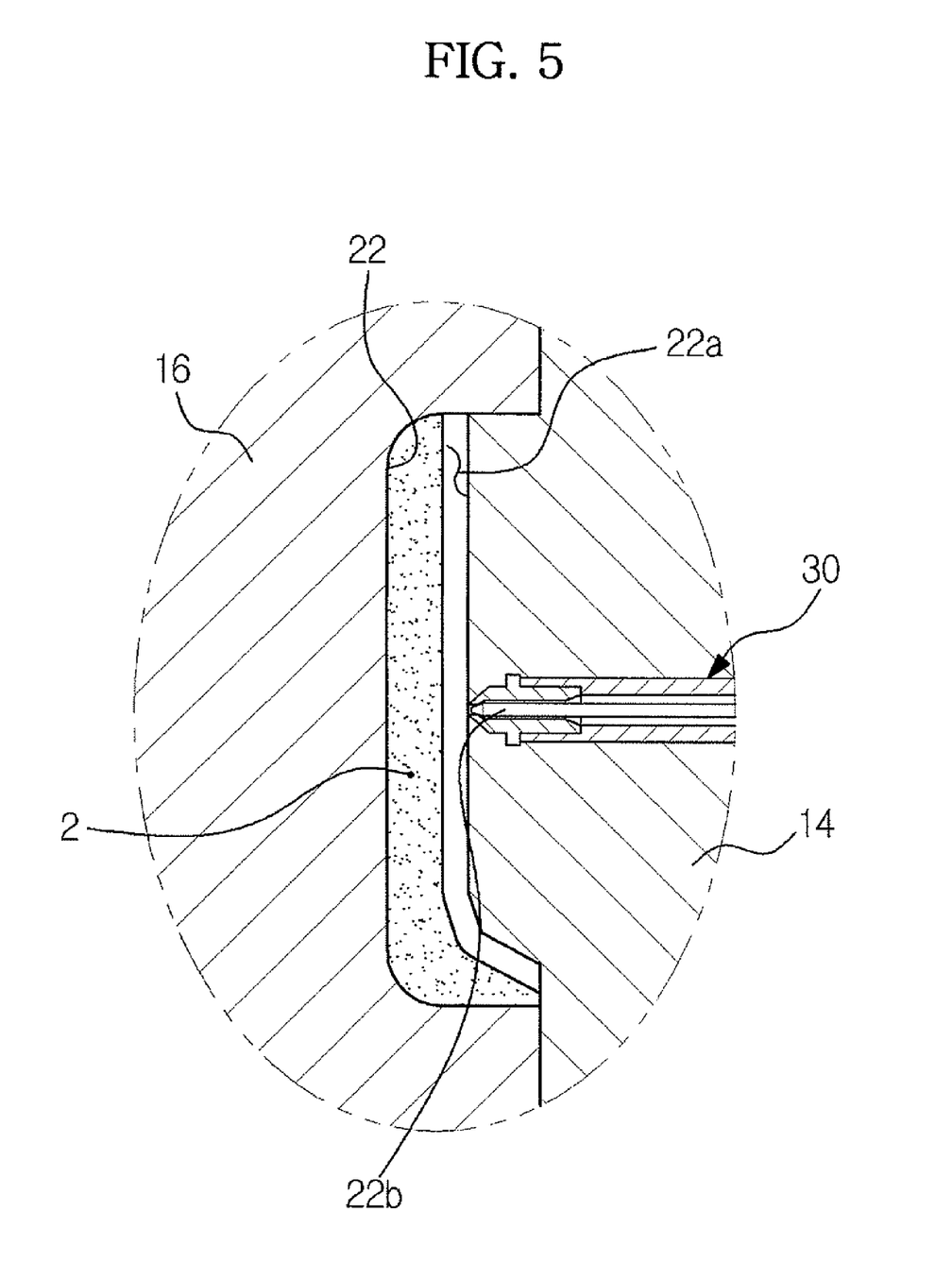
FIG. 5 is a detail view of a V portion in FIG. 2.

If molten resin (transparent resin) is injected into the first cavity 21 in a state illustrated in FIG. 2, the transparent layer 2 of the double molded product 1 is formed, as illustrated in FIG. 4. After the transparent layer 2 is formed, the molds are disassembled from each other. As illustrated in FIG. 3, the rotatable supporting plate 13 is rotated at 180 degrees, so that the positions of the first rotatable mold 16 and the second rotatable mold 17 are exchanged. The transparent layer 2 formed in the first cavity 21 is moved to the second cavity 22 while being positioned in the first rotatable mold 16. Accordingly, if the molds are all assembled again, as illustrated in FIG. 5, a space 22a to form the colored layer 3 (FIG. 6) is provided in the second cavity 22 while the transparent layer 2 is positioned in the second cavity 22. By injecting molten resin (colored resin) into the space 22a, as illustrated in FIG. 6, the double molded product 1, in which the transparent layer 2 and the colored layer 3 are united, is produced.

As illustrated in FIG. 2, after the molds are all assembled, molding operations (injection of molten resin) with respect to the first cavity 21 and the second cavity 22 are simultaneously performed. After the molds are disassembled from each other, the double molded product 1 (FIG. 6) formed in the second cavity 22 is drawn out. As illustrated in FIG. 3, the first and second rotatable molds 16 and 17 are rotated so that the positions thereof are exchanged. The transparent layer 2 formed in the first cavity 21 is rotated while being positioned in the first or second rotatable mold 16 or 17, and is moved to the second cavity 22. The injection molding machine can successively produce the double molded product 1 illustrated in FIG. 6, through repetition of the above processes.

When the transparent layer 2 (molded piece) formed in the first cavity 21 is moved to the second cavity 22 by the rotation of the first and second rotatable molds 16 and 17, the transparent layer 2 should not be separated from the first or second rotatable mold 16 or 17. To achieve this, a supporter is provided at the first and second rotatable molds 16 and 17 or the movable mold 15, so as to prevent separation of the transparent layer 2 (molded piece) formed in the first cavity 21 when the molds are disassembled from each other.

Figure 7:
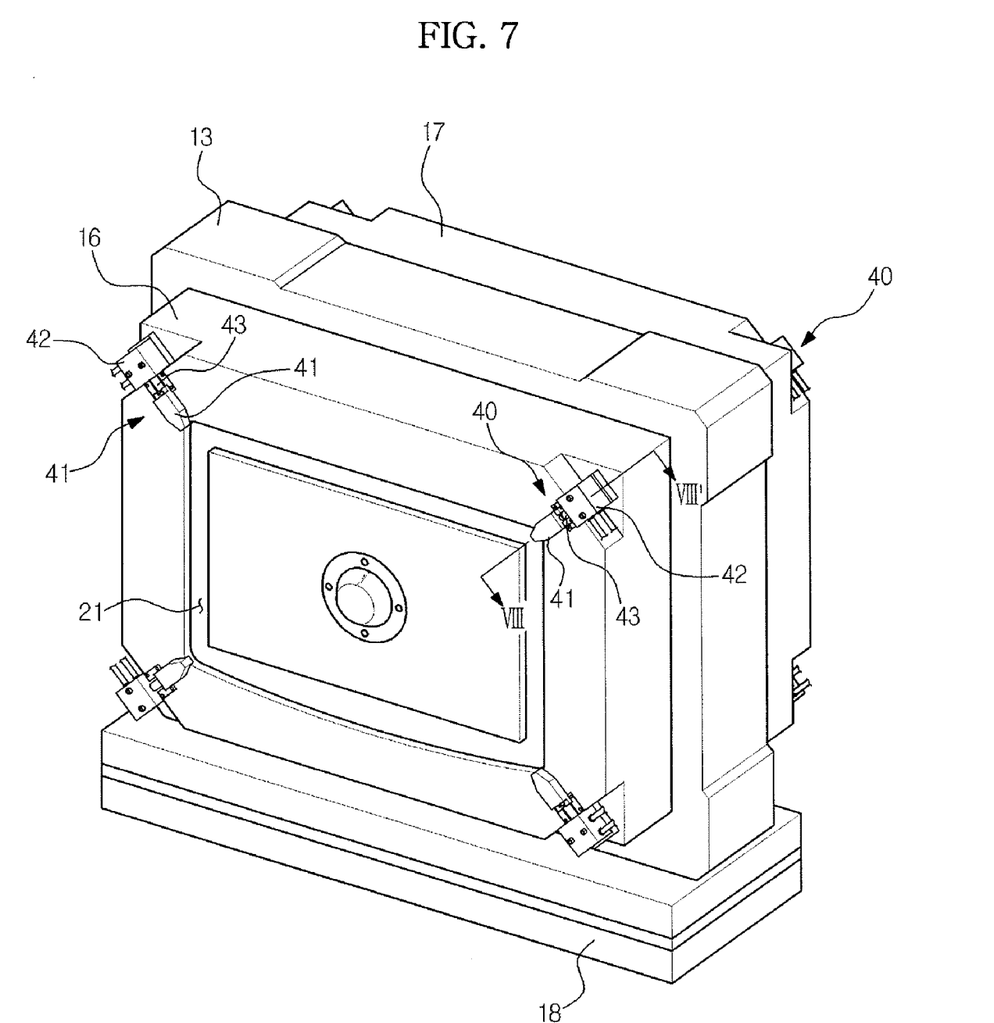
FIG. 7 is a perspective view illustrating a binding device of the injection molding machine according to an embodiment of the present general inventive concept.
Figure 8:
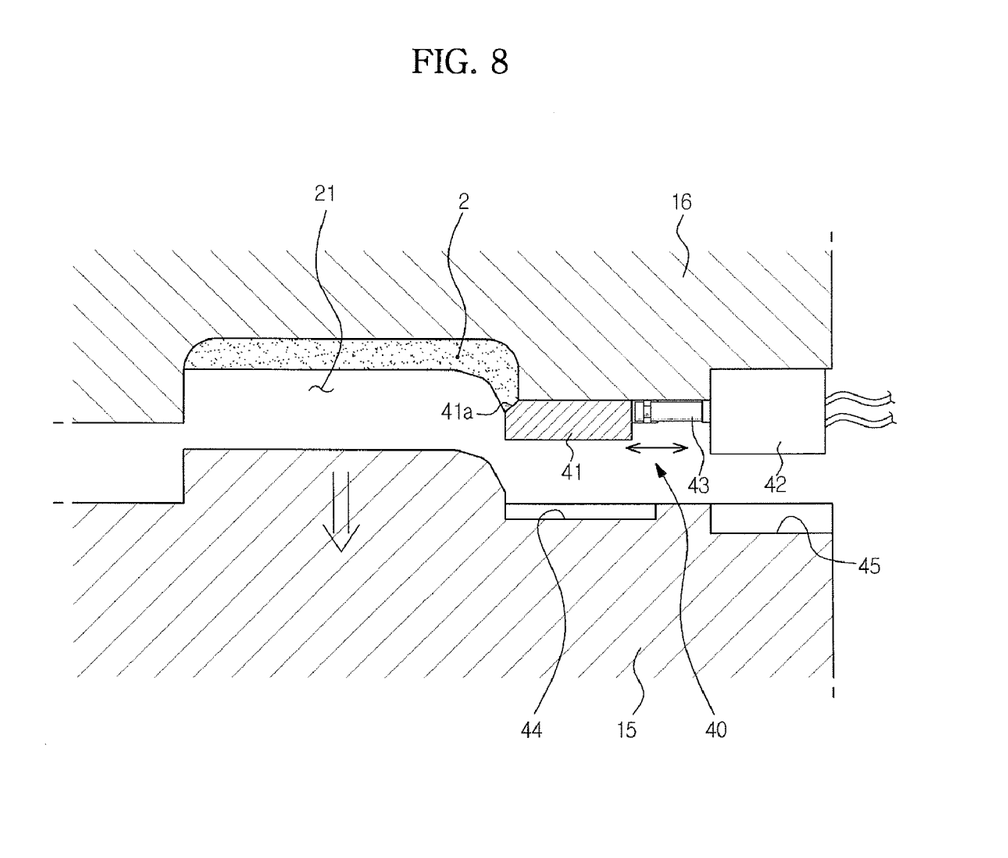
FIG. 8 is a sectional view taken along line VIII-VIII' in FIG. 7.

FIGS. 7 and 8 illustrate binding devices 40 provided at the first and second rotatable molds 16 and 17, as a first example of the supporter to support the transparent layer 2 (molded piece). Each of the binding devices 40 includes a binding member 41 rectilinearly movably mounted to the first and second rotatable molds 16 and 17 to bind or release the transparent layer 2, and a driving unit 42 mounted to the first and second rotatable molds 16 and 17 to move the binding member 41 back and forth. The binding devices 40, as illustrated in FIG. 7, are mounted to all corners of the first and second rotatable molds 16 and 17 so as to bind all corners of the transparent layer 2 (molded piece).

As illustrated in FIGS. 7 and 8, the binding members 41 can be moved back and forth in a direction toward a periphery from a center of the first and second rotatable molds 16 and 17. Accordingly, the binding members 41 can bind the transparent layer 2 (molded piece) by moving into the first cavity 21, and can release the transparent layer 2 by moving away from the first cavity 21. Also, when the movable mold 15 is assembled with the first rotatable mold 16 or the second rotatable mold 17, front ends 41a of the respective binding members 41 define the corners of the first cavity 21. Therefore, as illustrated in FIG. 8, though the movable mold 15 is disassembled from the first or second rotatable mold 16 or 17 after the transparent layer 2 is formed, the transparent layer 2 is not separated from the first cavity 21 by the front ends 41a of the binding members 41 binding the transparent layer 2. Further, since the front ends 41a of the binding members 41 are adapted to define the first cavity 21 together with the molds 15 and 16, generation of scars on the molded piece can be minimized.

The driving unit 42 may be configured as a hydraulic cylinder having a movable rod 43, or an electric actuator using a solenoid. The rod 43 of the driving unit 42 is connected with the binding member 41. Therefore, the binding member 41 is moved back and forth by the operation of the driving unit 42, to thereby bind or release the transparent layer 2 (molded piece). As illustrated in FIG. 8, the movable mold 15 is formed with receiving recesses 44 and 45, in which a portion of the binding member 41 and a portion of the driving unit 42 can be received when the molds 15 and 16 are assembled with each other.

The binding devices 40 keep binding the transparent layer 2 until the first and second rotatable molds 16 and 17 are rotated to exchange the positions thereof and the transparent layer 2 formed in the first cavity 21 is moved to the second cavity 22, and then release the transparent layer 2 at a moment the first or second rotatable mold 16 or 17 is assembled with the fixed mold 14. Alternatively, the binding devices 40 may be set to keep binding the transparent layer 2 even after the transparent layer 2 is moved to the second cavity 22 (FIG. 2) and the first or second rotatable mold 16 or 17 is assembled with the fixed mold 14 (i.e., even during the molding operation in the second cavity).

Figure 9:
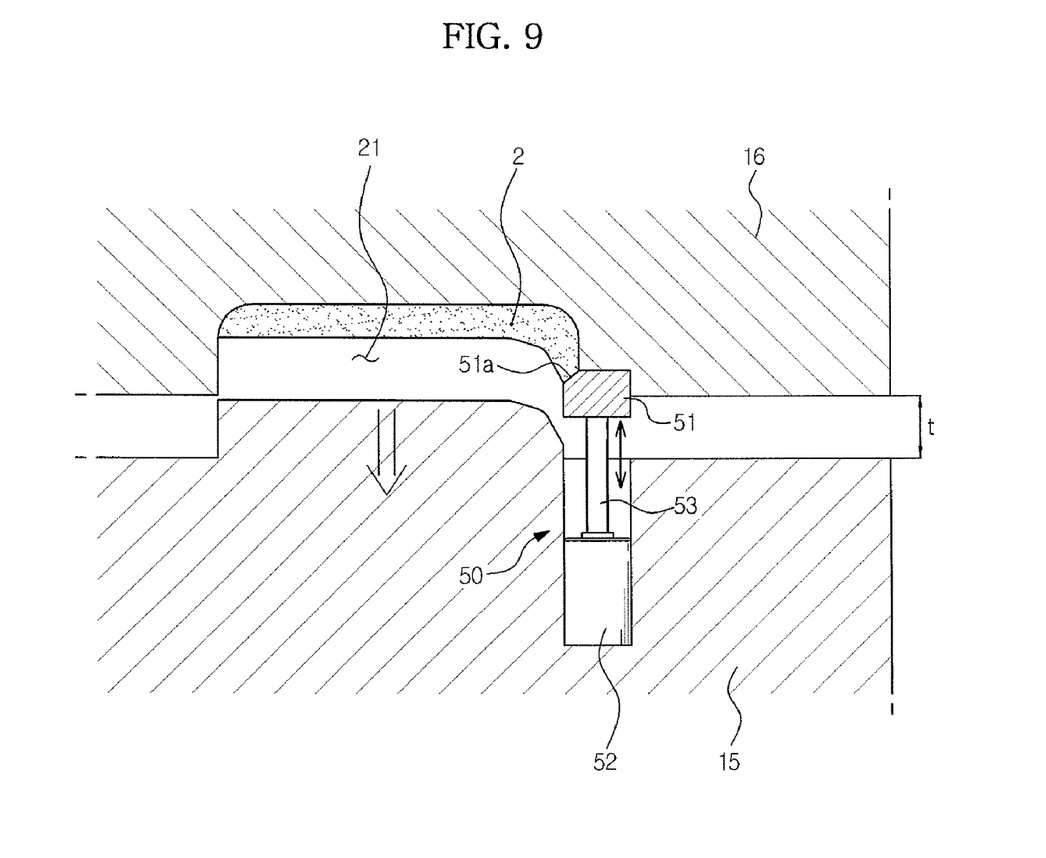
FIG. 9 is a sectional view illustrating a pressing device of the injection molding machine according to an embodiment of the present general inventive concept, which illustrates a state that a pressing member presses a molded piece.
Figure 10:
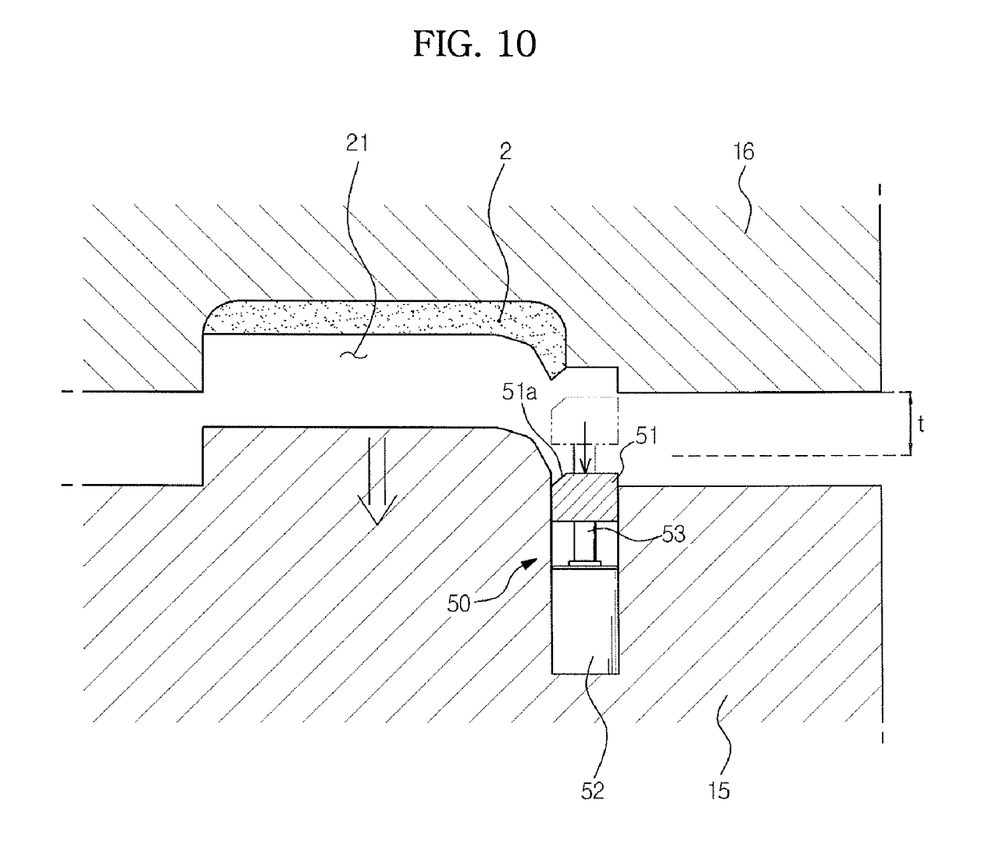
FIG. 10 is a sectional view illustrating the pressing device of the injection molding machine according to an embodiment of the present general inventive concept, which illustrates a state that the pressing force of the pressing member on the molded piece is removed.
Figure 11:
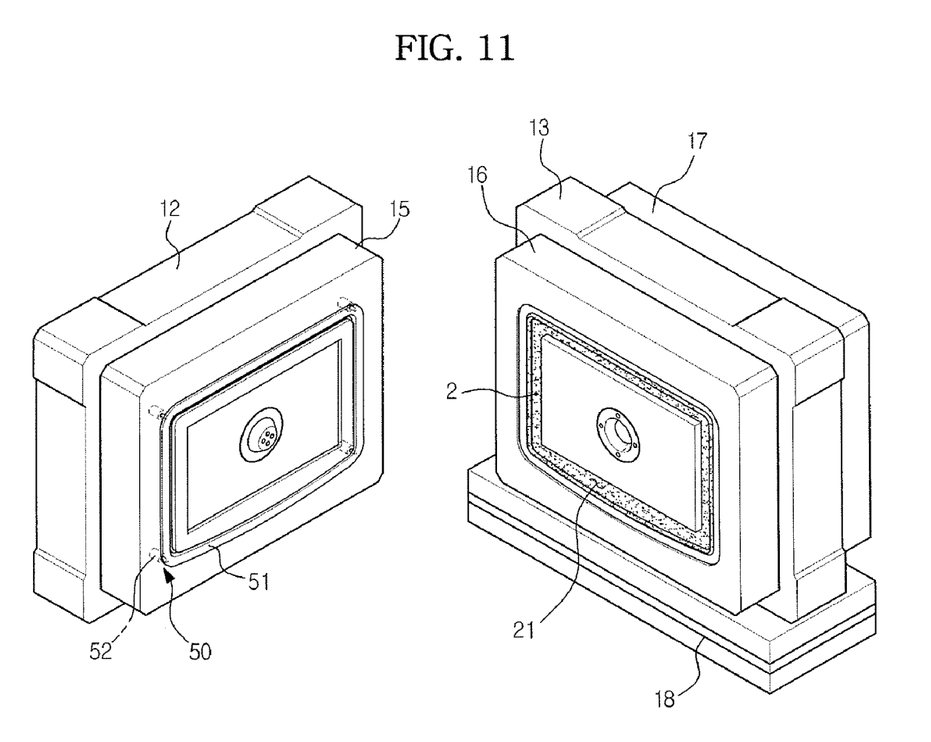
FIG. 11 is a perspective view illustrating the pressing device of the injection molding machine according to an embodiment of the present general inventive concept.

FIGS. 9 to 11 illustrate a pressing device 50 provided at the movable mold 15, as a second example of the supporter to support the transparent layer 2 (molded piece). The pressing device 50 includes a pressing member 51 rectilinearly movably mounted to the movable mold 15 to press or release the transparent layer 2 formed in the first cavity 21, and driving units 52 mounted to the movable mold 15 to move the pressing member 51 back and forth.

As illustrated in FIG. 11, the pressing member 51 has a shape extended continuously along the periphery of the transparent layer 2 (periphery of the first cavity) in order to evenly press the periphery of the transparent layer 2 formed in the first cavity 21. The driving units 52 are arranged apart from each other in the movable mold 15 in order for the pressing member 51 to evenly press the transparent layer 2. As illustrated in FIGS. 9 and 10, each of the driving units 52 may be configured as a hydraulic cylinder having a movable rod 53, or an electric actuator using a solenoid. The rod 53 of each driving unit 52 is connected with the pressing member 51. Therefore, the pressing member 51 is moved back and forth in a direction of assembling or disassembling the first or second rotatable mold 16 or 17 with/from the movable mold 15, by the operation of the driving units 52, and thereby can press or release the transparent layer 2 (molded piece) formed in the first cavity 21.

As illustrated in FIG. 9, while the first or second rotatable mold 16 or 17 and the movable mold 15 are assembled with each other, a front end 51a of the pressing member 51 defines the periphery of the first cavity 21. Though the molds are disassembled from each other, the front end 51a of the pressing member 51 keeps pressing the transparent layer 2, thereby preventing separation of the transparent layer 2 from the first cavity 21. Further, since the front end 51a of the pressing member 51 is adapted to define the first cavity 21 together with the molds 15 and 16, generation of scars on the molded piece can be minimized.

As illustrated in FIG. 9, the pressing member 51 keeps pressing the transparent layer 2 (molded piece) by the driving units 52 pushing the pressing member 51, until the first or second rotatable mold 16 or 17 is disassembled from the movable mold 15 and is spaced at a first gap (t) from the movable mold 15. Thereafter, as illustrated in FIG. 10, the driving units 52 pull the pressing member 51 toward the movable mold 15 to release the transparent layer 2 at the moment the first or second rotatable mold 16 or 17 and the movable mold 15 move away from each other more than the first gap (t). This is to hold the transparent layer 2 (molded piece) in the first or second rotatable mold 16 or 17 by the pressing member 51 temporarily pressing the transparent layer 2 (molded piece) while the movable mold 15 and the first or second rotatable mold 16 or 17 are disassembled from each other.

As illustrated in FIG. 10, even after the molds 15 and 16 are disassembled from each other and the pressing force of the pressing member 51 on the transparent layer 2 is removed, the transparent layer 2 is not separated from the first cavity 21. This is because static electricity, frictional force and clamping force are exerted between the first or second rotatable mold 16 or 17 and the transparent layer 2, and a space between the outer surface of the transparent layer 2 and the inner surface of the first cavity 21 forms a vacuum. Accordingly, the transparent layer 2 can be stably moved to the second cavity 22 by the rotation of the first and second rotatable molds 16 and 17 while being held in the first or second rotatable mold 16 or 17.

Figure 12:
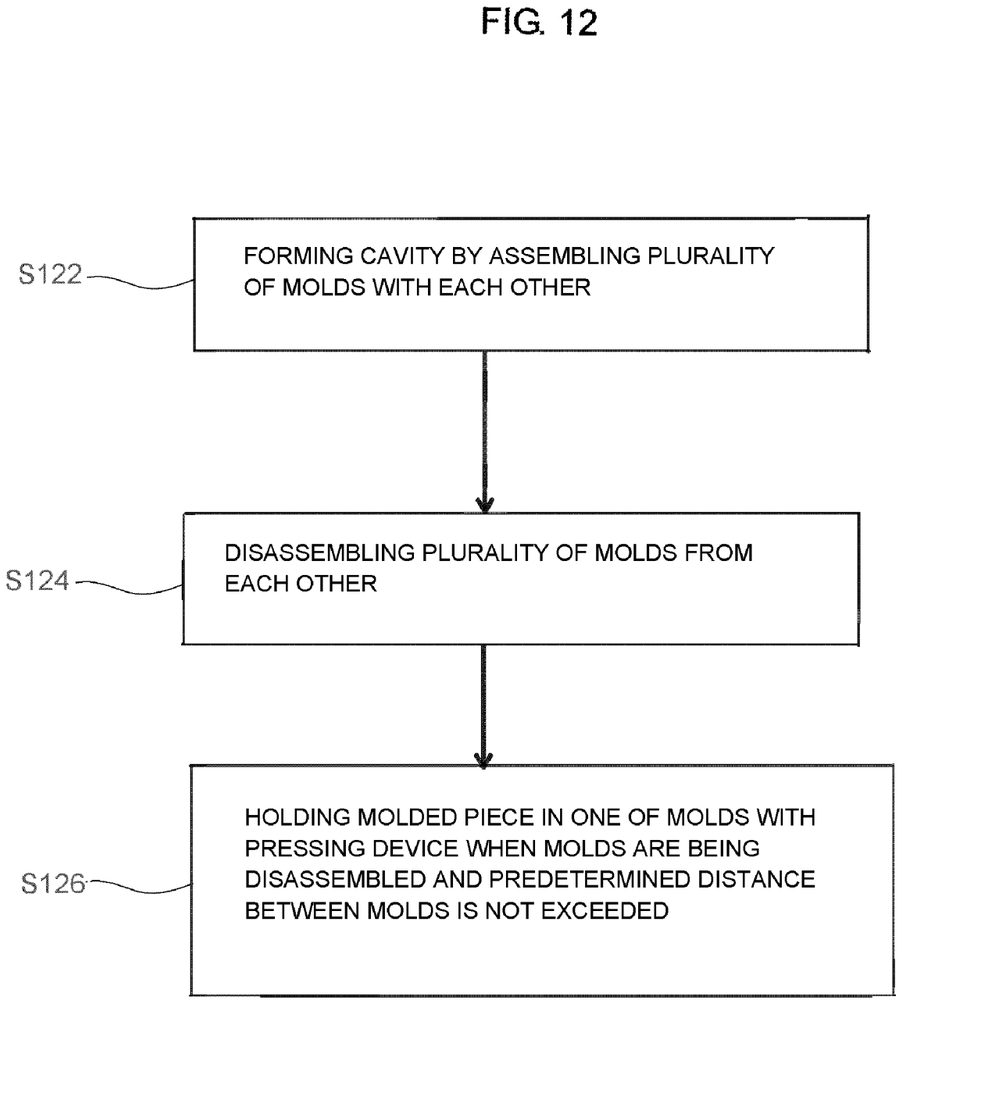
FIG. 12 is a flowchart illustrating a method of operating an injection molding machine according to an embodiment of the present general inventive concept.

FIG. 12 is a flowchart illustrating a method of operating an injection molding machine according to an embodiment of the present general inventive concept. Referring to FIGS. 9 and 11, in operation S122, a cavity 21 is formed by assembling a plurality of molds 15 and 16 with each other. In operation S124, the plurality of molds 15 and 16 are disassembled from each other. In operation S126, a molded piece 2 is held in one of the molds with a pressing device 50 when the molds 15 and 16 are being disassembled and a predetermined distance t between the molds 15 and 16 is not exceeded.

Although it has been described that the binding device 40 or the pressing device 50 is applied to the double injection molding machine as illustrated in FIG. 1, the binding device 40 or the pressing device 50 can also be applied to a general injection molding machine including a first mold and a second mold, which are assembled or disassembled with/from each other, to produce a molded product through a single molding process.

As apparent from the above description, the injection molding machine according to various embodiments of the present general inventive concept can prevent separation of the molded piece from the mold after the molds are disassembled from each other, because the molded piece is bound by the binding device or pressed by the pressing device when the molds are disassembled from each other. Accordingly, post processes (e.g., coating process of the molded piece, secondary injection molding process, etc.) can be stably carried out.

Further, when the molds are in a state of being assembled with each other, a portion of the binding member binding the molded piece or a portion of the pressing member pressing the molded piece defines the cavity together with the molds. Accordingly, generation of scars on a final molded product can be minimized.

Although embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. A method of operating an injection molding machine, the method comprising:
    forming a cavity by assembling a plurality of molds with each other, such that the plurality of molds includes two rotatable molds of substantially the same shape and movably and rotatably mounted between two outer molds,
    disassembling the plurality of molds from each other; and
    holding a molded piece in one of the molds with a pressing device along a pressing device path when the molds are being disassembled and a predetermined distance between the molds is not exceeded, the pressing device to move independently from the two rotatable molds and the outer mold, wherein the two rotatable molds rotate about an axis perpendicular to the pressing device path, and wherein the pressing device moves in a first direction to press the molded piece and then moves in a second direction to release the molded piece when a first of the rotatable molds and the outer mold move away from each other by a distance more than a predetermined gap.

2. The method according to claim 1, wherein the pressing device includes a pressing member to press the molded piece.

3. The method according to claim 1, wherein the pressing device includes a pressing member to define a periphery of the cavity, the pressing member including a front end portion defining the periphery of the cavity with each of the rotatable molds and each of the outer molds while being in a state of assembly with each other.

4. An injection molding machine, comprising:
 a first mold;
 a second mold;
 first and second rotatable molds of substantially the same shape and movably and rotatably mounted between the first mold and the second mold, the first and second rotatable molds being selectively assembled with the second mold to form the first cavity and selectively assembled with the first mold to form a second cavity; and
 at least one pressing device to press a molded piece so that the molded piece is held in the first rotatable mold when the first rotatable mold and the second mold are disassembled from each other, the pressing device including a pressing member movably mounted to the second mold to press or release the molded piece and at least one driving unit mounted to the second mold to move the pressing member independently from the first rotatable mold and the second mold, wherein the at least one driving unit moves the pressing member in a first direction to press the molded piece and then moves the pressing member in a second direction to release the molded piece when the first rotatable mold and the second mold move away from each other by a distance more than a predetermined gap.

5. The injection molding machine according to claim 4, wherein the pressing member is moved back and forth in a direction of assembling or disassembling the first rotatable mold and the second mold with/from each other.

6. The injection molding machine according to claim 4, wherein the pressing member keeps pressing the molded piece until the rotatable first mold and the second mold are disassembled and spaced at the predetermined gap from each other.

7. The injection molding machine according to claim 4, wherein the pressing member comprises:
 a front end portion defining a portion of the cavity with each of the first rotatable mold and the second rotatable mold while the first rotatable mold and the second mold are in a state of being assembled with each other and the pressing member.

8. The injection molding machine according to claim 4, wherein the pressing member has a shape extended continuously along a periphery of the molded piece to evenly press the periphery of the molded piece, and
 the at least one driving unit includes plural driving units arranged apart from each other in the second mold so that the pressing member evenly presses the molded piece.

9. The injection molding machine according to claim 4, wherein the driving unit comprises:
 a hydraulic cylinder.

10. An injection molding machine, comprising:
 a fixed mold;
 a movable mold spaced apart from the fixed mold;
 two rotatable molds of substantially the same shape and movably and rotatably mounted between the fixed mold and the movable mold, the two rotatable molds being selectively assembled with the movable mold to form a first cavity and selectively assembled with the fixed mold to form a second cavity; and
 a pressing device to press a first molded piece formed in the first cavity so that when one of the two rotatable molds is disassembled from the movable mold, the first molded piece is held in one of the two rotatable molds,
 wherein the pressing device includes a pressing member movably mounted to the movable mold to press or release the first molded piece along a pressing device path, and at least one driving unit mounted to the movable mold to move the pressing member independently from the two rotatable molds and the movable mold,
 wherein the two rotatable molds rotate about an axis perpendicular to the pressing device path, and further wherein the at least one driving unit moves, the pressing member in a first direction to press the first molded piece and then moves the pressing member in a second direction to release the first molded piece when one of the two rotatable molds and the movable mold move away from each other by a distance more than a predetermined gap.

11. The injection molding machine according to claim 10, wherein the pressing member is moved back and forth in a direction of assembling or disassembling one of the two rotatable molds and the movable mold with/from each other.

12. The injection molding machine according to claim 10, wherein the pressing member keeps pressing the first molded piece until one of the two rotatable molds and the movable mold are disassembled and spaced at the predetermined gap from each other.

13. The injection molding machine according to claim 10, wherein the pressing member comprises:
 a front end portion defining a portion of the first cavity with each of the two rotatable molds while one of the two rotatable molds and the movable mold are in a state of being assembled with each other and the pressing member.

14. The injection molding machine according to claim 10, wherein the pressing member has a shape extended continuously along a periphery of the first molded piece to evenly press the periphery of the first molded piece, and
 the at least one driving unit includes plural driving units arranged apart from each other in the movable mold so that the pressing member evenly presses the first molded piece.

* * * * *